Dec. 12, 1967    R. E. ALSCH    3,357,277
VARIABLE SPEED PLANETARY FRICTION GEAR TRANSMISSION
Filed July 14, 1966    2 Sheets-Sheet 1

INVENTOR
RICHARD E. ALSCH
BY Bayard H. Michael
ATTORNEY

INVENTOR
RICHARD E. ALSCH

BY *[signature]*
ATTORNEY

United States Patent Office 3,357,277
Patented Dec. 12, 1967

3,357,277
VARIABLE SPEED PLANETARY FRICTION GEAR TRANSMISSION
Richard E. Alsch, Lannon, Wis., assignor to Graham Transmissions, Inc., Menomonee Falls, Wis., a corporation of Delaware
Filed July 14, 1966, Ser. No. 565,234
5 Claims. (Cl. 74—796)

This invention relates to improvements in variable speed transmissions of the type employing a group of inclined longitudinally tapered planetary rollers intermediate the drive and driven shaft and a non-rotatable encircling contact ring adjustable lengthwise with respect to the rollers to regulate the planetary action and thus vary the speed and direction of rotation to the driven shaft.

The present invention has for its principal purpose the improvement and simplification of the transmission of this type shown in my application Ser. No. 495,886, filed Oct. 14, 1965.

Another object is to provide 100% rolling in the drive— that is, to eliminate slip or spin.

Other objects and advantages will be pointed out in, or be apparent from, the specification and claims, as will obvious modifications of the single embodiment shown in the drawings, in which:

Figure 1:
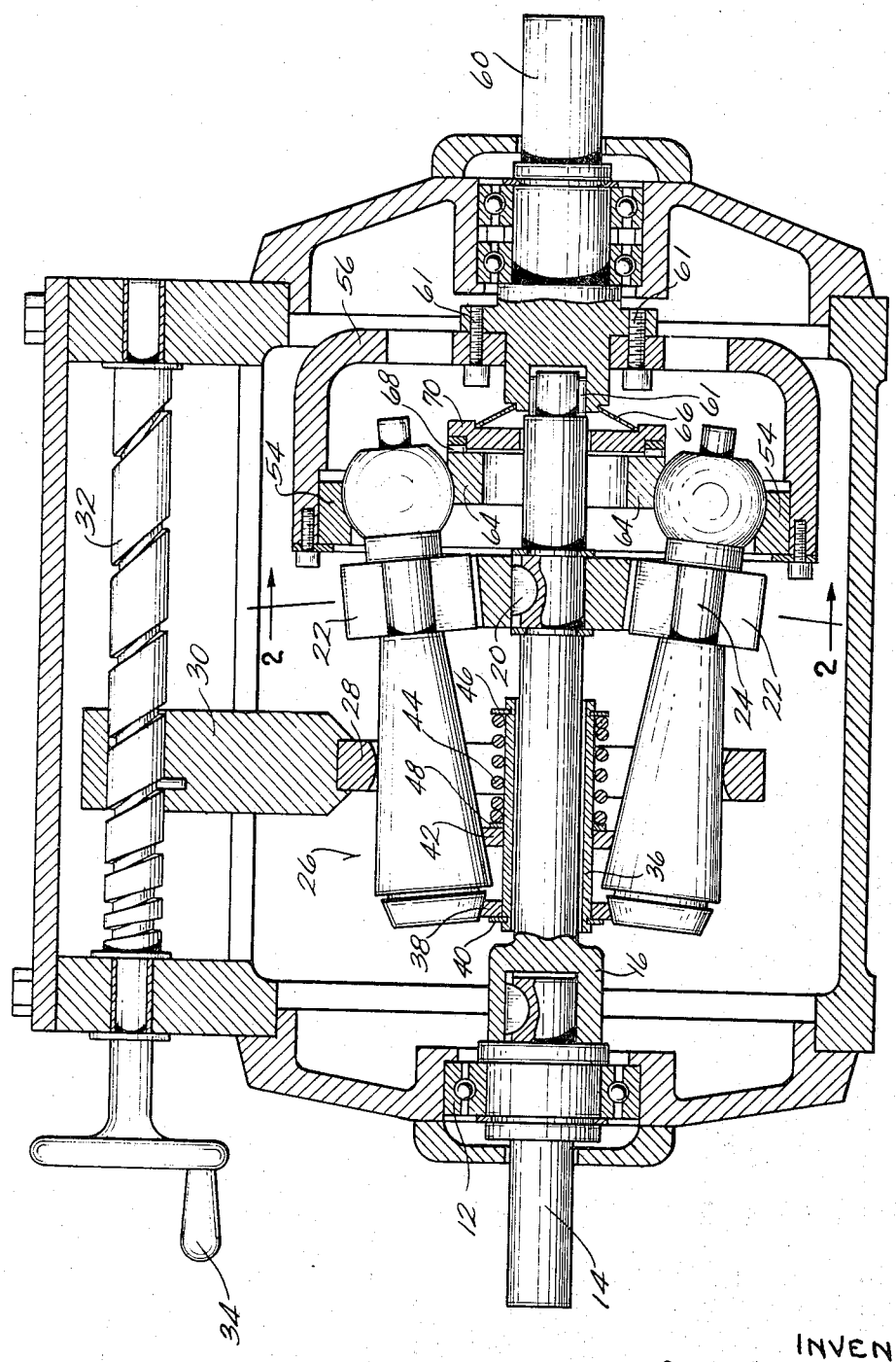
FIG. 1 is a vertical section through a transmission according to this invention.
Figure 2:
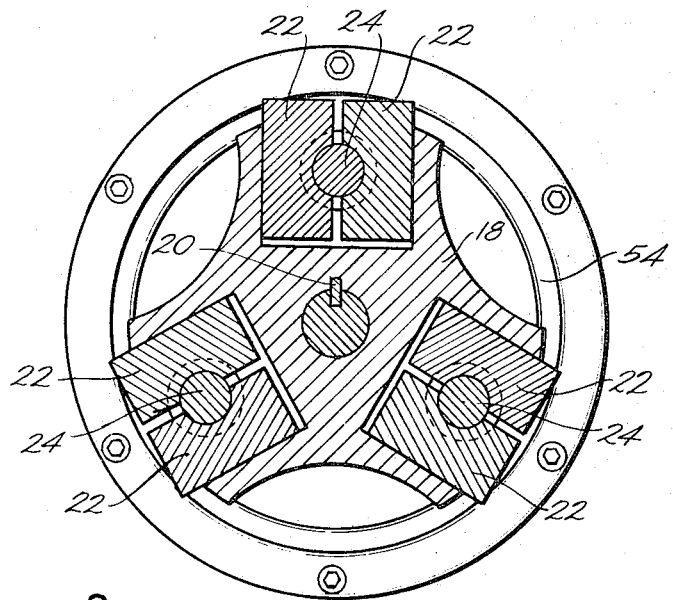
FIG. 2 is a vertical section taken as indicated by line 2—2 on FIG. 1 showing the spider and bearing block arrangement for supporting and driving the rollers.

The transmission is contained in a housing 10 having bearing 12 supporting stub shaft 14 which is keyed to the input shaft 16 but one shaft could be used if desired. The illustrated construction permits somewhat more versatility in adaption to standard motor shafts. The input shaft 16 has a spider 18 axially fixed thereon and connected thereto by means of key 20. The spider provides three radially disposed slots or grooves which support the split bearing blocks 22 which, in turn, support the cylindrical reduced diameter section 24 of the roller assemblies 26. It will be seen in FIGS. 1 and 3 that the rollers are supported on an axis inclined at six degrees with respect to the axis of the input shaft 16. The rollers are tapered at six degrees so the outside of each roller is parallel to the shaft 16 and can run on the inside surface of ring 28 which is non-rotatably supported by yoke 30 carried and actuated by lead screw 32 supported in the upper part of the housing and actuatable by the handle 34 to adjust the ring axially of the rollers and, hence, vary the output speed, as will be more fully explained hereinafter.

While it is not necessary that the rollers be preloaded into contact with the control ring 28, the present construction does so preload the rollers to obtain greater torque at low speed. Thus, sleeve 36 is loosely fitted on the input shaft and has at the left end a tapered loading ring 38 seated against the snap ring 40 and at an intermediate position has another loading ring 42 of the same diameter as ring 38 acting against the roller 26. Compressed spring 44 seats against snap ring 46 at the right end and against washer 48 at the left so that its force is applied directly to the loading ring 42 and indirectly to loading ring 38 through the sleeve 36 whereby the two loading rings are equally loaded against the roller to urge it outwardly into contact with control ring 28 to augment centrifugal forces. As previously indicated, this construction is not necessary in all cases and frequently can be omitted. The specific preloading construction is shown and claimed in my copending application Ser. No. 323,428, filed Nov. 13, 1963, now Patent No. 3,274,859.

As the input shaft is rotated the spider will cause the rollers to rotate about the axis of the shaft 16 and, by reason of the rolling contact with the fixed control ring 28, the rollers will also rotate about their own axes and this motion, in turn, will, of course, reflect in rotation of the ball-shaped right end of the roller assembly. The balls 52 roll in outer half-race 54 fixed in carrier 56 connected to output member 58 which, in turn, is connected by screws 61 to the output shaft 60 which supports pilot bearings 62 for the right end of the input shaft 16. At the inside of the balls there are half-races 64 which are spring loaded to the left by Belleville spring 66 acting through thrust bearing 68 carried by annular member 70 to force the balls against the outer half-race. The half-races as well as the member 70 all have clearance with respect to shaft 16. The force of spring 66 is selected to be greater than the slip forces which will appear at the ball if the output shaft 60 should stall. This forces the slip to occur between the rollers and the ring 28 rather than appearing at the races where damage could be done. As centrifugal force acts on the rollers they will tend to swing outwardly about the center point of the ball 52 since this outward motion is permitted by the spider 18 while the spider at the same time prevents skewing action of the rollers tending to throw them out of purely radial motion. Thus the spider and the associated bearing blocks 22 both support and drive the roller assembly while at the same time restrain the swinging motion of the roller assembly to purely radial motion.

Figure 3:
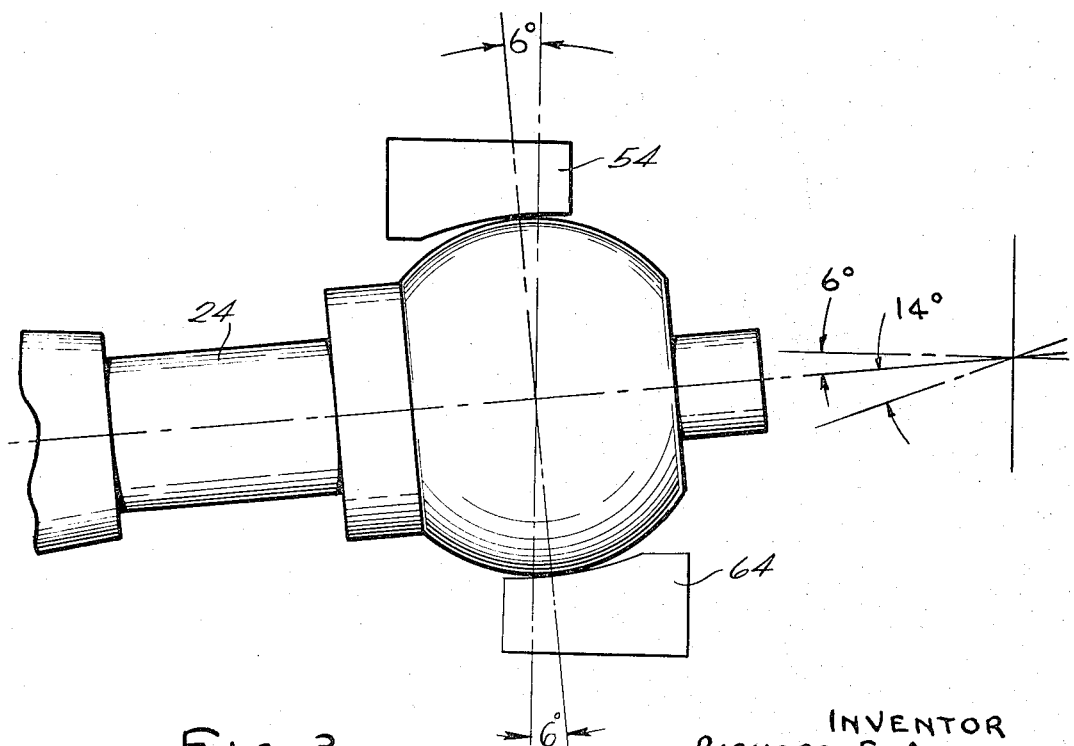
FIG. 3 is an enlarged detail showing the contact between the ball drive and the half-races.

FIG. 3 is an enlarged detail of the contact between the ball 52 and the half-races. It will be seen that the roller assembly is inclined at six degrees and, therefore, the point of contact between the ball and half-races 54, 64 is six degrees off vertical or off a plane normal to the axis of the transmission. It is in the plane normal to the roller axis. My prior design employed a split inner race which, in absence of perfection, could result in slippage (inefficiency) at the races. This is impossible in the present design which insures pure rolling contact. The curvature of the races is slightly greater than the ball curve to achieve "line" contact.

Ignoring the motion imparted by the roller rotation about its own axis, 1 r.p.m. in the clockwise direction (viewed from the left) at the input shaft will directly appear as 1 r.p.m. at the race 54 and the output shaft 60. Now taking the control ring diameter as four and setting it at the one inch diameter location on the roller, it will be seen that 1 r.p.m. clockwise rotation of the input shaft forces the roller to roll counterclockwise at four times the input speed, or 4 r.p.m. This speed is superimposed on that previously indicated above and is transmitted to the outer race through the ball with the ball to race 54 having a four to one reduction. Therefore, the counterclockwise 4 r.p.m. of the roller is reduced to a counterclockwise 1 r.p.m. at the race and this is the opposite direction of the 1 r.p.m. transmitted directly to the race from the input shaft with the result that the net output speed is zero. As the control ring is moved towards the larger diameter it can be shown that the output speed can be increased over infinite steps until the maximum output speed of 1 r.p.m. is reached. If it is desired, the zero point of the drive could be moved along the roller to any desired point so that instead of having a range of 1 r.p.m. to zero, it would have, say, plus one-half down to zero and to minus one-half. In all cases it will be appreciated that the 1 r.p.m. discussed can just as readily be 1800 r.p.m. or whatever input speed is selected.

If desired, the outer race 54 can be fixed and the output shaft driven from the inner race. This will give an output speed in a ratio of 2½ to 3½ times the input speed either as a reduction or as a step-up, depending upon which end is driven. Such an arrangement permits excellent selection of output speed within the speed range.

This design reduces the outer race of my prior design to a half-race and the former split inner race is replaced by a half-race with the result that the ball-race contact is perpenduicular to the roller axis. This gives 100% rolling contact with no side spin or slip which could occur with normal tolerance variations in my prior design. The inner half-race acts like a wedge under its spring loading to effectively multiply the spring force. Manufacturing costs are reduced since fewer precision parts are required.

Although but a single embodiment of the present invention has been illustrated and described, it will be apparent to those skilled in the art that various changes and modifications may be made therein without departing from the spirit of the invention or from the scope of the appended claims.

I claim:
1. A variable speed transmission comprising:
    an input shaft;
    a drive spider mounted on the shaft;
    a plurality of inclined planetary tapered rollers rotatably mounted in the spider for rotation about the shaft axis and their own axes;
    a non-rotatable control ring encircling and contacting the rollers;
    means for moving the ring axially of the rollers and shaft;
    a drive member fixed with respect to each roller and presenting spherical surfaces;
    a ring-type outer race engaged by the drive members and driven thereby;
    an inner race-half contacting the drive members; and
    a driven shaft connected to one of the races.
2. A transmission according to claim 1 in which each roller is supported in bearing means and the spider is provided with radially disposed slots permitting outward movement of the rollers about the center of the spherical surfaces of the drive member.
3. A variable speed transmission according to claim 1 in which the curvature of the races is slightly greater than the curvature of the spherical surfaces and the races contact the spherical surfaces on opposite sides of a plane common to the centers of the spherical surfaces, and including
    a spring biasing the inner race in a direction tending to wedge the drive members outwardly.
4. A transmission according to claim 3 in which the spring force is great enough to prevent slippage between the spherical portions and the races when a stalling load is applied to the output shaft whereby the slippage will occur between the roller portions and the ring.
5. A transmission according to claim 4 including
    a loading member,
    said spring acting between the loading member and the driven shaft,
    and a thrust bearing between the loading member and the inner race to transmit the spring force to the inner race while allowing differential rotation between the member and race.

References Cited

UNITED STATES PATENTS

| | | | |
|---|---|---|---|
| 2,342,071 | 2/1944 | Bade | 74—796 |
| 2,578,914 | 12/1951 | Bade | 74—796 |
| 2,580,392 | 1/1952 | Bade | 74—796 |
| 2,706,916 | 4/1955 | Graham | 74—796 |
| 2,874,593 | 2/1959 | Legros | 74—796 |
| 3,035,459 | 5/1962 | Legros | 74—796 |
| 3,224,300 | 12/1965 | Chery | 74—796 |

ROBERT A. O'LEARY, *Primary Examiner.*

LEONARD H. GERIN, *Examiner.*